(12) United States Patent
Vander Boegh et al.

(10) Patent No.: US 6,508,077 B1
(45) Date of Patent: Jan. 21, 2003

(54) COLLAPSIBLE COOLER FOR GAME

(76) Inventors: Todd M. Vander Boegh, 2395 Rosewood, Jenison, MI (US) 49428; Kerwin Post, 380-139th Ave., Wayland, MI (US) 49348

( * ) Notice: Subject to any disclaimer, the term of this patent is extended or adjusted under 35 U.S.C. 154(b) by 0 days.

(21) Appl. No.: 10/161,626

(22) Filed: Jun. 5, 2002

(51) Int. Cl.[7] ................................................. F25D 3/08
(52) U.S. Cl. ...................................... 62/457.2; 62/530
(58) Field of Search ........................... 62/457.1, 457.2, 62/371, 530; 224/92, 103

(56) References Cited

U.S. PATENT DOCUMENTS

| | | |
|---|---|---|
| 2,518,651 A | 8/1950 | Weiss et al. |
| 3,674,188 A | 7/1972 | Anderson |
| 4,301,920 A * | 11/1981 | Boggs .................... 206/315 R |
| 4,335,891 A * | 6/1982 | Alley et al. .................... 280/19 |
| 4,530,220 A * | 7/1985 | Nambu et al. ................ 62/530 |
| 4,779,524 A | 10/1988 | Wade |
| 4,785,766 A | 11/1988 | Blalock, Jr. |
| 4,802,233 A | 1/1989 | Skamser |
| 4,887,823 A | 12/1989 | Hallett et al. |
| 5,090,526 A | 2/1992 | Jacober |
| 5,190,376 A | 3/1993 | Book |
| 5,249,438 A | 10/1993 | Rhaney et al. |
| 5,265,960 A | 11/1993 | Shikler |
| 5,285,656 A | 2/1994 | Peters |
| 5,336,124 A | 8/1994 | Garside |
| 5,346,309 A | 9/1994 | Book |
| 5,423,195 A | 6/1995 | Peters |
| 5,562,228 A | 10/1996 | Ericson |
| 5,761,992 A | 6/1998 | Gallo |
| 5,820,268 A | 10/1998 | Becker et al. |
| 6,237,171 B1 * | 5/2001 | Allen ............................ 5/482 |
| 6,253,569 B1 | 7/2001 | Hall |
| 6,276,698 B1 | 8/2001 | Calandra |

FOREIGN PATENT DOCUMENTS

| | | |
|---|---|---|
| CA | 2 077 972 | 3/1993 |
| GB | 2 175 383 A | 11/1986 |

* cited by examiner

Primary Examiner—Denise L. Esquivel
Assistant Examiner—Melvin Jones
(74) Attorney, Agent, or Firm—Richard C. Litman

(57) ABSTRACT

A collapsible cooler is configured to hold perishable foods, such as freshly killed big game on ice while in the field. The cooler is formed of an outer layer and an inner layer of waterproof nylon fabric with two intermediate layers of heat resistant insulation. In a closed configuration, the cooler is secured and drawn together via a set or mating series of hook and loop fasteners to form an aperture for exposing the neck and head portion of captured big game. In this configuration, a carcass of the captured game is kept cool and fresh from a surrounding stream of cold air. A natural drain is formed at the base of the cooler to allow for natural flow of fluid from the cooler to a surrounding area.

20 Claims, 5 Drawing Sheets

COLLAPSIBLE COOLER FOR GAME

BACKGROUND OF THE INVENTION

1. Field of the Invention

The present invention relates generally to coolers. More specifically, the invention is a collapsible cooler for perishable foods or freshly killed game.

2. Description of the Related Art

Numerous collapsible coolers have been devised for retaining the freshness of game, produce, and the like. As further described below, conventional collapsible coolers for use in the hunter's field have yet to provide the simplicity and ease of use according to the instant invention. Most of the conventional coolers include roller features or the requirement of complex tether connections and/or compartments as rigid structures which are difficult to use as portable devices in the field. Some of the conventional coolers suffering these particular problems are those issued to Blalock, Jr. (U.S. Pat. No. 4,785,766), Rhaney et al. (U.S. Pat. No. 5,249,438) and Peters (U.S. Pat. Nos. 5,285,656 and 5,423,195).

Other collapsible cooler features have been directed to general heat insulative features such as those widely used in the pizza delivery industry and/or for fruit ripening. These conventional features are described in the U.S. Patents issued to Skamser (U.S. Pat. No. 4,802,233) and Wade (U.S. Pat. No. 4,77,524), respectively. Other U.S. and Foreign Patents which describe food preserving collapsible coolers are those respectively issued and granted to Jacober (U.S. Pat. No. 5,09,526), Book (U.S. Pat. No. 5,190,376 and CA 2077972), Shikler (U.S. Pat. No. 5,265,690), Ericson (U.S. Pat. No. 5,562,228) Becker et al. (U.S. Pat. No. 5,820,268) and Ohlsson (GB 2 175 383 A). These particular coolers are described having special handle features with multiple compartments and/or the utilization of motorized parts such as fans, respectively. They are primarily used for transport in automobiles and the like, and are not directed to applications involving the hunting and/or harvesting of game.

U.S. Patents which are application specific to game hunting and the like are those issued to Weiss et al. (U.S. Pat. No. 2,518,651), Anderson is (U.S. Pat. No. 3,674,188), Hallete et al. (U.S. Pat. No. 4,887,823), Garside (U.S. Pat. No. 5,336, 124), Calandra (U.S. Pat. No. 6,276,698 B1) and Gallo (U.S. Pat. No. 5,761,992) Of particular note are the U.S. Patents issued to Weiss et al. and Anderson. Weiss et al. describes a flexible game bag of rectangular construction and having a drain conduit mechanically secured thereto. According to Anderson (U.S. Pat. No. 3,674,188), this device is described as a game receptacle, including an outer water-pervious burlack sack having a plurality of apertures for water drainage and a shoulder strap which covers the opening of the sack.

U.S. Patents issued to Hallet et al., Garside and Calandra are directed to dragging tarps for covering deer prior to subsequent transport. U.S. Pat. No. 5,761,992 issued to Gallo discloses a portable animal storage unit adapted to an auxiliary refrigeration unit. The unit is adapted for use in storing, transporting and preserving game animals. The unit is eight feet tall, three feet wide and two feet deep. At least one of the panels is provided with a reclosable opening for accessing an internal cavity of the enclosure in order to place a harvested animal within the enclosure and to remove the animal therefrom. Various handles are provided externally of the enclosure for carrying. A fine screen mesh is used to form part of the enclosure for ventilation.

None of the above inventions and patents, taken either singularly or in combination, is seen to describe the instant invention as claimed. Thus a collapsible cooler for game solving the aforementioned problems is desired.

SUMMARY OF THE INVENTION

The collapsible cooler according to the invention is configured to hold perishable foods, such as freshly killed big game or the like on ice while in the field. The cooler is formed of an outer layer and an inner layer of waterproof nylon fabric with an intermediate layer of heat resistant insulation. In a closed configuration, the cooler is secured and drawn together via a set or mating series of hook and loop fasteners to form an aperture for exposing the neck and head portion of captured game. In this configuration, a carcass of the captured game is kept cool and fresh from a surrounding stream of cold air. A natural drain is formed at the base of the cooler to allow for natural flow of fluid from the cooler to a surrounding area. Auxiliary straps are also used to provide additional security for the captured game.

Accordingly, it is a principal object of the invention to provide a collapsible cooler for retaining the freshness and prevent spoilage of captured big game.

It is another object of the invention to provide a collapsible cooler for big game which is light weight.

It is a further object of the invention to provide a collapsible cooler for big game having a natural drain.

Still another object of the invention is to provide a collapsible cooler for big game having releasible fasteners.

Further still, it is an object of the invention to provide a collapsible cooler for big game which is waterproof.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a collapsible cooler adapted for use in storing, transporting and preserving particularly big game animals (eg. deer, elk, antelope, moose, etc.) and/or extending the life of freshness of foods or captured big game G, while in the field. The preferred embodiments of the present invention are depicted in FIGS. 1–5, and are generally referenced by numerals 6 and 7, respectively.

Figure 1:
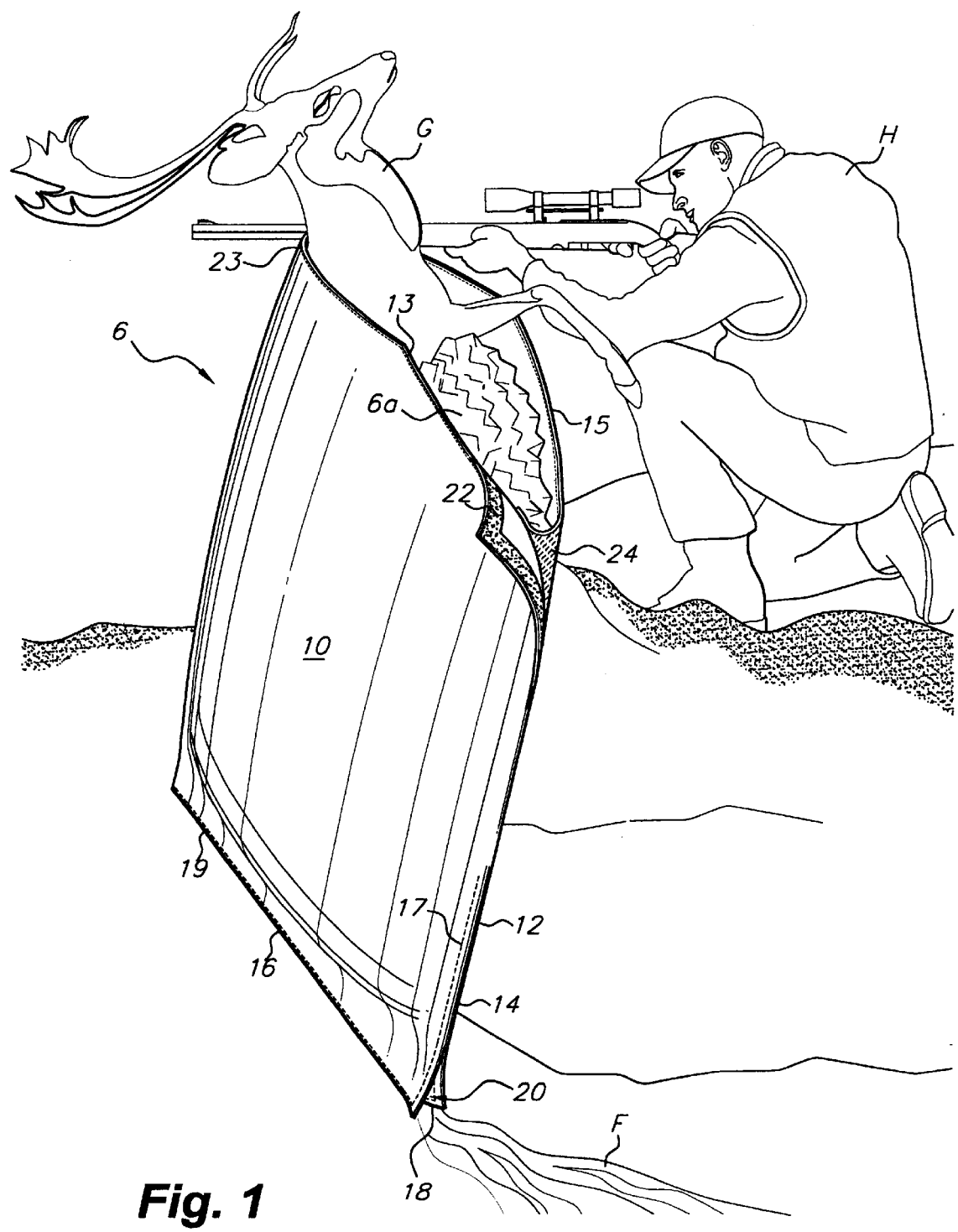
FIG. 1 is an environmental, perspective view of a collapsible cooler for big game according to the present invention.

As best seen in FIG. 1, the collapsible cooler 6 according to a first embodiment is shown in environmental perspective to illustrate the exemplary use of the cooler 6 by a hunter H in the field. As shown therein the collapsible cooler 6 is filled with captured big game G. As shown therein, the game G is placed on ice 6a disposed within the cooler to retain a certain level of freshness as a temporary measure until further or permanent preservation of the food can be maintained.

Figure 3:
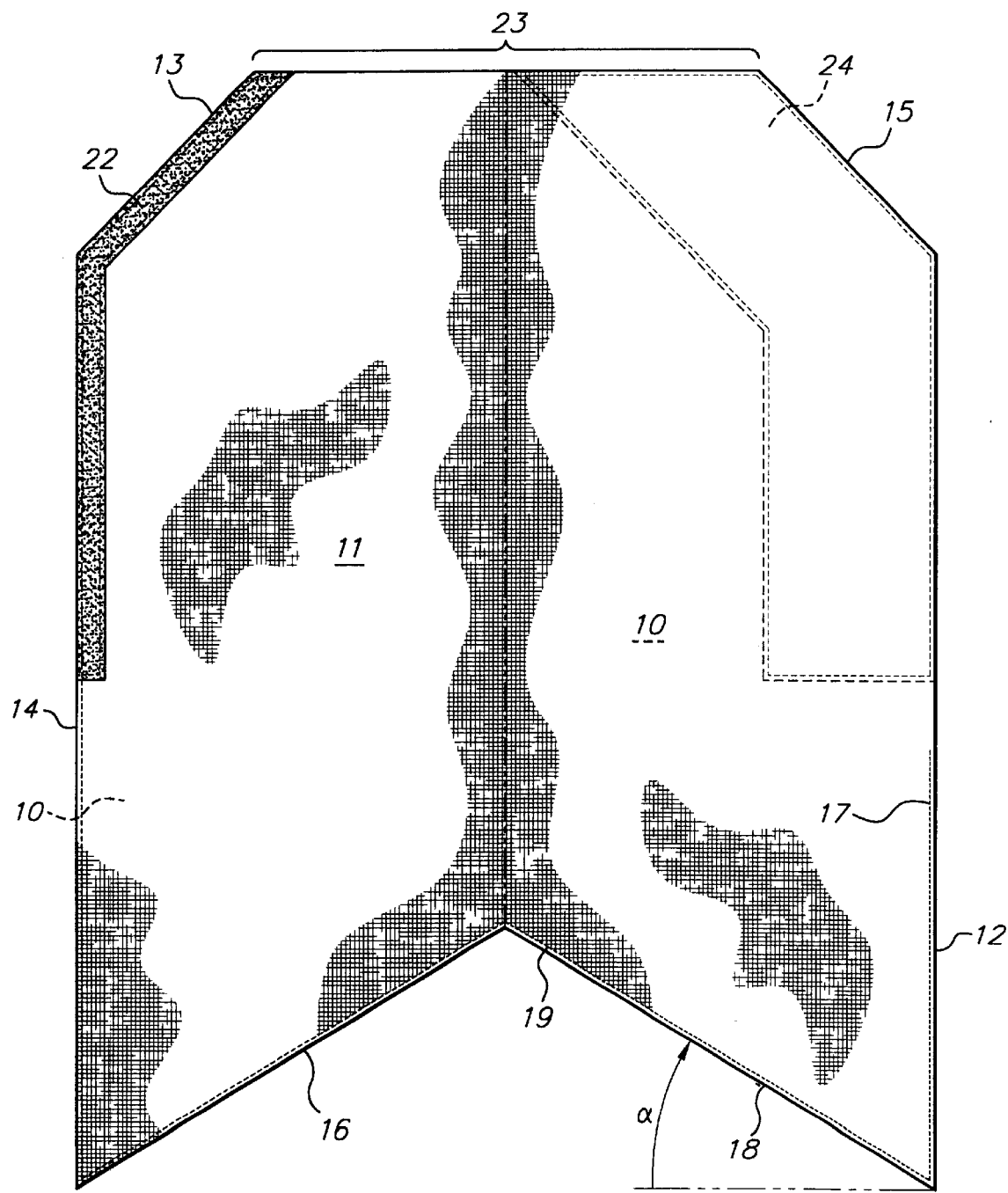
FIG. 3 is a plan view of the collapsible cooler, illustrating a drain angle made with respect to an outer bottom edge of the cooler.

The collapsible featured of the cooler 6 is implied from the foldable nature of the nylon packcloth fabric of which the cooler 6 is preferably made. As shown in FIGS. 1 and 3, the collapsible cooler 6 comprises a single multi-layered fabric 10 having at least a first edge portion 12, a second edge portion 14, a third edge portion 13, a fourth edge portion 15, a fifth edge portion 16 and a sixth edge portion 18. A first attachment fastener 17 made in the form of at least one mechanical stitch 17 attaches edge portion 12 to edge portion 14 along a predetermined length of the respective edges. This particular attachment forms one element of the enclose compartment of the cooler 6. In this regard, it is preferred to maintain at least a one inch unstitched length at a base portion of the cooler to allow for the formation of a natural drain 20 further discussed below.

The configuration of the cooler 6 is further illustrated by the utilization of at least one second attachment fastener 19 or mechanical stitch 19 for attaching the fifth edge portion 16 to the sixth edge portion 18. It should be noted that the fifth and sixth edge portions are sloped to form a drain or flow angle α (where 0<α<45 degrees) with respect to an imaginary axis formed with the adjoined edge portions 12,14. This angle α is made to allow the force of gravity to naturally force fluid F in the form of melted ice uninhibited through the drain aperture 20. This particular feature is further illustrated in FIG. 3. Accordingly, the first and second attachment fasteners 17 and 19 attaches the respective edge portions 12,14,16 and 18 of the fabric 10 at an angle α to form an interior cooler compartment having a predetermined volume V with at least one natural drain 20 formed therewith at its base.

The natural drain 20 is developed and formed from non-mating/unstitched edge portions 12 and 14 at a selected drain depth of one inch, measured from the base of the cooler 6 upward along the respective edges 12,14. The sewn portion 17 preferably extends from the one inch base line of the fabric 10 up to a preferable height of 36 inches at least. It should be noted that other dimensional characteristics can be used by one having ordinary skill in the relevant art as a mere matter of design choice.

Where the stitched portion 17 terminates upward from the base portion, third and fourth edge portions 13,15, respectively begin and are made contiguous therewith (as shown in the figure.). An outer portion of the fabric 10, adjacent the third edge portion 13 and substantially along its length is disposed at least one loop fastener 22. In alternative, loop fastener 22 can be made as an integral sum of a distinct number of single patches of loop fasteners space disposed along the length of the third edge portion 13, or any other arrangement so long as the scope and intent of its use are preserved as intended.

Similarly, disposed within an interior region 11 at a location 11a of the cooler 10 is at least one hook fastener 24 for mating attachment with the respective loop fastener 22 as a releasable mechanical fastener. This particular mating feature is further illustrated in FIGS. 2A and 2B. It should be noted, however, other or equivalent fasteners such as waterproof chemical adhesives can be used as well. While these particular fasteners may be available as a equivalent alternatives, they have proven to be not nearly as effective.

Figure 2A:
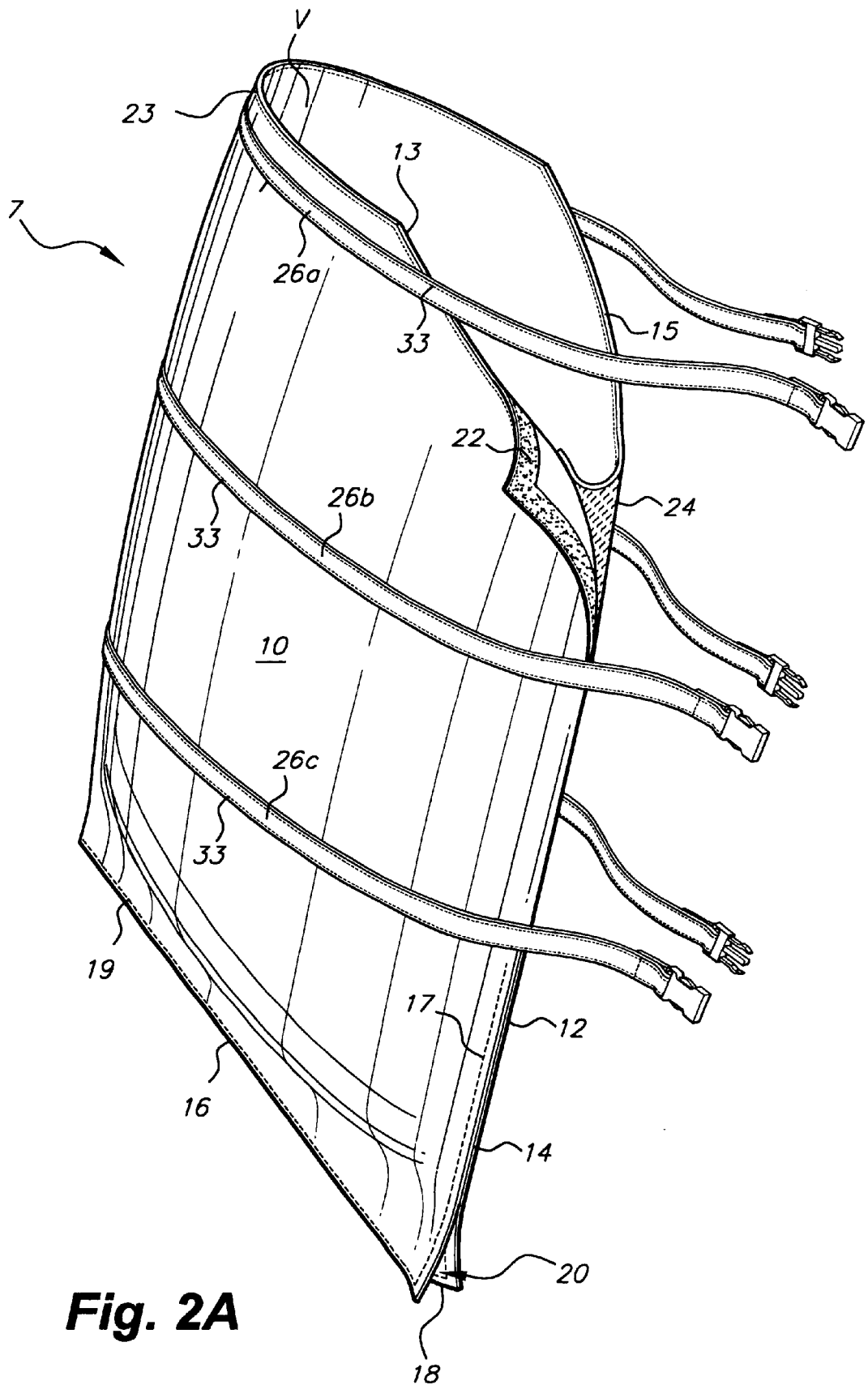
FIG. 2A is a perspective view of the collapsible cooler for big game according to a second embodiment, illustrating a plurality of straps for securing and enclosing captured big game therein.
Figure 2B:
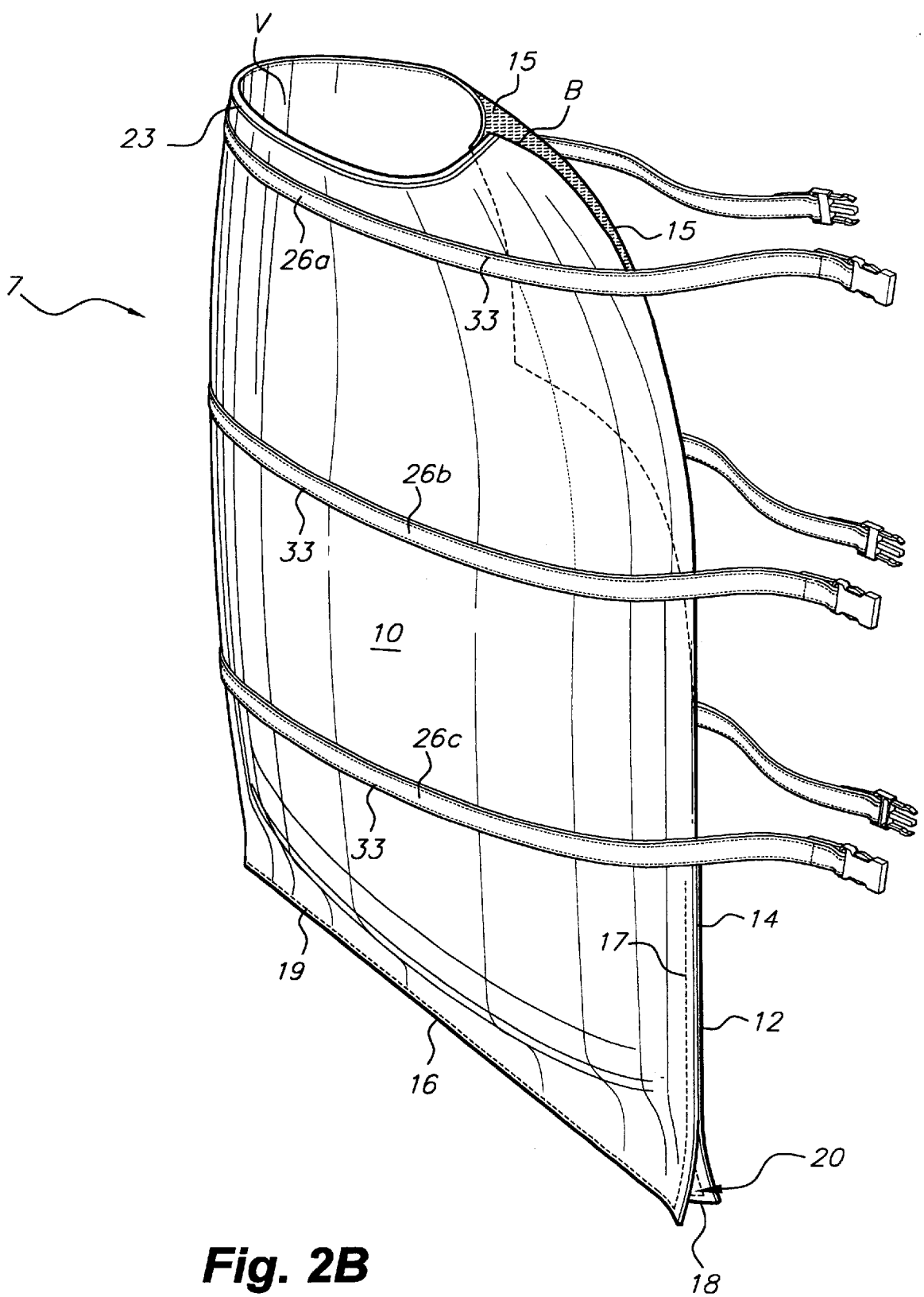
FIG. 2B is a perspective view of the collapsible cooler for big game according to a second embodiment, illustrating a plurality of straps and a partial enclosure of the cooler via a set hook and loop fasteners for securing and enclosing captured game therein.

As diagrammatically illustrated in FIGS. 2A and 2B, the collapsible cooler 7 is respectively shown, according to the second embodiment having a plurality of releasable straps 26a, 26b and 26c, sewn to the fabric portion 10 via a series of respective stitches 33. Accordingly, each releasable strap 26a, 26b and 26c is sewn to the fabric 10 in spaced relation vertically with respect to each, and are individually and linearly aligned and arranged along the peripheral surface 10 of the fabric, and having releasable respective male and female connectors for securing or retaining capture game G therein in a conventional fashion. That is, the straps 26a, 26b and 26c utilize cinch type buckles such as those used on motorcycle helments for attaching the chinstraps. This allows the respective straps 26a, 26b and 26c to be drawn tightly around any sized animal.

As depicted in FIG. 2B, the collapsible cooler 7 is shown in partial perspective to illustrate the mating surface features off the hook and loop fasteners 22 and 24, respectively. When the respective edge portions 13 and 15 are secured together via the fasteners 22,24, the collapsible cooler 7 forms a substantially parabolic aperture indicated by edge portion 23 made contiguous therewith and formed opposing the natural drain 20.

Figure 4:
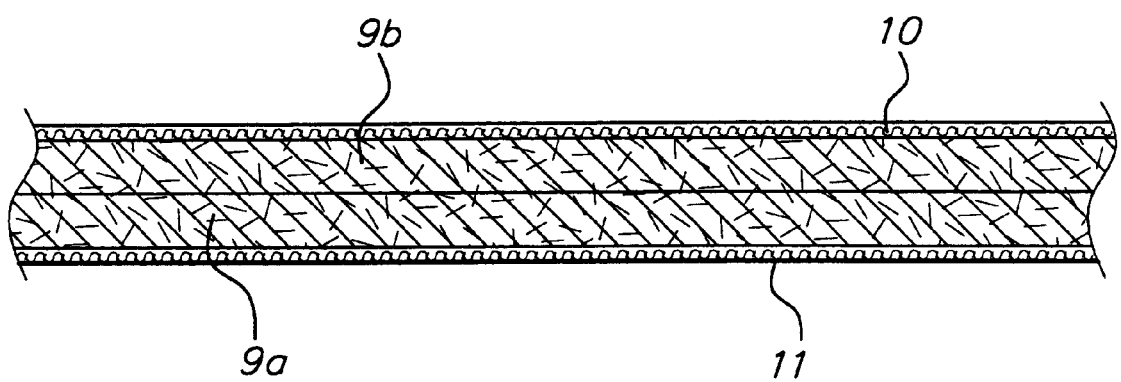
FIG. 4 is a perspective view of the multiple layer feature of the collapsible cooler.

As diagrammatically illustrated in FIG. 4, the multi-layer features of the collapsible cooler are shown having a first outer layer 10, an inner layer 11 and an intermediate layer 9. The first outer and inner layers 10,11 are made of a waterproof fabric material such as nylon packcloth, and two intermediate layers 9a and 9b are made of a white thermal insulation material such as THINSULATE™ and THERMA-FLECT™, respectively.

The primary advantages of the collapsible cooler rest with the multiple layer feature and natural drain feature 20 which provide sufficient convective cooling to insulate or retain a desired level of coolness (typically from 36–40 degrees F.) for maximizing the freshness of captured game or the like while in the field. The collapsible cooler 6,7 uniquely protects against the loss of the moisture content of the harvest game and serve to eliminate insect and bacteria contamination. The other advantage includes wherein the cooler can be hosed off and neatly folded or collapsed and stored away as a light-weight portable item.

In sum, the collapsible coller 6,7 has been designed for the needs cooling captured big game G (eg. deer, elk, antelope, moose, etc.). Upon the harvest of such game animals, the common procedure is to immediately field dress the animal (i.e. removal of all entrails), and hang the animal by its neck or antlers from an overhanging tree branch or beam. This is done to allow the bodily fluids to run out of the carcass and to allow the carcass to cool. When hunting in a cold environment the carcass typically freezes and can be allowed to hang in that respective position for an extended period of time. However, when hunting in a climate above forty degrees or above freezing refrigerated methods methods must be used to cool the carcass thereby ensuring freshness of the captured game G. Accordingly, the cooler 6,7 fastens securely around an animals neck and hang somewhat loosely around the rest of the body. Several different cooling methods can be used, but the utilization of ice has been found to be most practical.

It is to be understood that the present invention is not limited to the embodiment described above, but encompasses any and all embodiments within the scope of the following claims.

We claim:

1. A collapsible cooler for game, comprising:
   a fabric having at least a first edge portion, a second edge portion, a third edge portion, a fourth edge portion, a fifth edge portion and a sixth edge portion;
   at least one first attachment means for attaching a different one of said at least one of said edge portions to a different one of said another of said edge portions;
   a second attachment means for attaching at least one of said edge portions to another of said edge portions;
   the first and second attachment means being attached to the fabric at the respective edge portions to form an interior cooler compartment having a predetermined volume and at least one natural drain; said natural drain being formed from mating edge portions of said fabric formed with a flow angle with respect to said edges; and
   an interstitial cooling medium.

2. The collapsible cooler according to claim 1, wherein said second attachment means comprises at least one releasible fastener.

3. The collapsible cooler according to claim 2, wherein said at least one releasible fastener is a hook and loop fastener.

4. The collapsible cooler according to claim 1, wherein said at least one first attachment means provides a permanent attachment of the respective edge portions.

5. The collapsible cooler according to claim 1, wherein said at least one first attachment means comprises at least one first mechanical stitch for securing said first edge portion to said second edge portion a predetermined distance along the length of the respective edges.

6. The collapsible cooler according to claim 1, wherein said at least one first attachment means comprises at least one second mechanical stitch for securing said fifth edge portion to said sixth edge portion a predetermined distance along the length of the respective edges.

7. The collapsible cooler according to claim 1, wherein said third and fourth edge portions are mating edge portions, wherein said third edge portion comprises at least one loop fastener and said fourth edge portion comprises at least one hook fastener for mating attachment with said at least one of the respective loop fasteners of the third edge portion.

8. The collapsible cooler according to claim 7, wherein said third and fourth edge portions are mating edge portions which forms a substantially parabolic aperture contiguous therewith and opposite said at least one natural drain.

9. The collapsible cooler according to claim 1, wherein said fabric is a multi-layer fabric.

10. The collapsible cooler according to claim 1, wherein said multi-layer fabric a first outer layer, an inner layer and two intermediate layers.

11. The collapsible cooler according to claim 10, wherein the first and second layers are made of a waterproof fabric material.

12. The collapsible cooler according to claim 10, wherein said waterproof fabric material is nylon packcloth.

13. The collapsible cooler according to claim 10, wherein said intermediate layers are made of a white thermal insulation material.

14. A collapsible cooler for game, comprising in combination with a plurality of staps with male and female releasble connectors:
    a fabric having at least a first edge portion, a second edge portion, a third edge portion, a fourth edge portion, a fifth edge portion and a sixth edge portion;
    a first attachment means for attaching at least one of said edge portions to another of said edge portions;
    at least one second attachment means for attaching a different one of said at least one of said edge portions to a different one of said another of said edge portions; and
    the first and second attachment means being attached to the fabric at the respective edge portions to form an interior cooler compartment having a predetermined volume and at least one natural drain; said natural drain being formed from mating edge portions of said fabric formed with a flow angle with respect to said edges.

15. The collapsible cooler according to claim 14 wherein said first attachment means comprises at least one releasible fastener.

16. The collapsible cooler according to claim 15, wherein said at least one releasible fastener is a hook and loop fastener.

17. The collapsible cooler according to claim 14, wherein said second attachment means provides a permanent attachment of the respective edge portions.

18. The collapsible cooler according to claim 14 wherein said at least one second attachment means comprises at least one first mechanical stitch for securing said first edge portion to said second edge portion a predetermined distance along the length of the respective edges.

19. The collapsible cooler according to claim 14, wherein said at least one second attachment means comprises at least one second mechanical stitch for securing said fifth edge portion to said sixth edge portion a predetermined distance along the length of the respective edges;
    said third and fourth edge portions are mating edge portions, wherein said third edge portion comprises at least one loop fastener and said fourth edge portion comprises at least one hook fastener for mating attachment with said at least one of the respective loop fasteners of said third edge portion to form a substantially parabolic aperture contiguous therewith and opposite said at least one natural drain.

20. The collapsible cooler according to claim 14, wherein said fabric is a multi-layer fabric, said multi-layer fabric having a first outer layer, an inner layer and an intermediate layer;
    the first and second layers are made of a waterproof, nylon packcloth material, and further includes two heat resistant intermediate material layers.

* * * * *